(12) United States Patent
Haughom

(10) Patent No.: US 8,450,865 B2
(45) Date of Patent: May 28, 2013

(54) WIND TURBINE DEVICE

(75) Inventor: Per Olav Haughom, Tonstad (NO)

(73) Assignee: Angle Wind AS (NO)

( * ) Notice: Subject to any disclaimer, the term of this patent is extended or adjusted under 35 U.S.C. 154(b) by 406 days.

(21) Appl. No.: 12/812,508

(22) PCT Filed: Jan. 8, 2009

(86) PCT No.: PCT/NO2009/000008
§ 371 (c)(1),
(2), (4) Date: Sep. 30, 2010

(87) PCT Pub. No.: WO2009/091261
PCT Pub. Date: Jul. 23, 2009

(65) Prior Publication Data
US 2011/0018283 A1    Jan. 27, 2011

(30) Foreign Application Priority Data

Jan. 14, 2008  (NO) .................................. 20080229

(51) Int. Cl.
*F02B 63/04*  (2006.01)
*H02K 7/10*  (2006.01)
*H02K 7/18*  (2006.01)

(52) U.S. Cl.
USPC ........................................................ 290/1 C

(58) Field of Classification Search
USPC ............................................ 290/1 C, 44, 55
See application file for complete search history.

(56) References Cited

U.S. PATENT DOCUMENTS

| 381,313 | A | 4/1888 | Winchell |
| 4,291,233 | A | 9/1981 | Kirschbaum ..................... 290/1 |
| 4,311,435 | A | 1/1982 | Bergero |
| 5,249,924 | A | 10/1993 | Brum ............................ 416/48 |
| 5,669,758 | A | 9/1997 | Williamson ....................... 416/4 |
| 7,255,537 | B2 | 8/2007 | Flamang et al. .............. 416/170 |
| 7,552,664 | B2 * | 6/2009 | Bulatowicz ..................... 74/640 |
| 2007/0204723 | A1 | 9/2007 | Saito |
| 2007/0275816 | A1 * | 11/2007 | Henderson .................... 475/331 |

FOREIGN PATENT DOCUMENTS

| DE | 11 67 147 B | 4/1964 |
| DE | 29 32 293 A1 | 2/1981 |
| DE | 38 15 118 A1 | 11/1989 |
| EP | 1 783 402 A1 | 5/2007 |
| WO | WO 96/18815 | 6/1996 |

OTHER PUBLICATIONS

International Preliminary Examination Report on Patentability issued Jul. 29, 2010 in corresponding International Application No. PCT/NO2009/00008.
International Search Report dated Mar. 3, 2010, issued in corresponding international application No. PCT/NO2009/000008.

* cited by examiner

*Primary Examiner* — Javaid Nasri
(74) *Attorney, Agent, or Firm* — Ostrolenk Faber LLP

(57) ABSTRACT

A wind turbine device, in which the rotor of the wind turbine is connected to a rotor shaft, and in which a torque is transmitted from the rotor to a power machine, and in which the torque is transmitted between the rotor and power machine via a harmonic gear.

2 Claims, 4 Drawing Sheets

WIND TURBINE DEVICE

CROSS REFERENCE TO RELATED APPLICATIONS

The present application is a 35 U.S.C. §371 National Phase conversion of PCT/NO2009/000008, filed Jan. 8, 2009, which claims benefit of Norwegian Application No. 20080229, filed Jan. 14, 2008, the disclosure of which is incorporated herein by reference. The PCT International Application was published in the English language.

FIELD OF THE INVENTION

This invention relates to a wind turbine. More particularly, it relates to a wind turbine in which the rotor of the wind turbine is connected to a rotor shaft, and in which a torque is transmitted from the rotor to a power machine.

BACKGROUND OF THE INVENTION

As wind turbines are built for constantly greater power, transmission elements transmitting the torque between the rotor of the wind turbine and a power machine must be dimensioned up correspondingly.

According to the prior art, a generator is often positioned in an elevated nacelle at the rotor. The torque is transmitted from the rotor to the power machine, which is generally constituted by an electric generator, via a gearbox. The gearbox is necessary for stepping up the relatively low rotational speed of the rotor to a rotational speed which is suitable for the generator.

The total weight of the gearbox and generator is considerable. Especially for offshore wind turbines such big masses positioned at a relatively high level above the seabed mean that the supporting structures will be comprehensive and expensive.

It is known to transmit the torque from the rotor via transmission elements to a generator which is at ground level, see for example German patent application 2932293.

The transmission of the torque via a simple, vertical shaft at substantially the same rotational speed as the rotor is conditional on the supporting structure of the wind turbine being dimensioned for absorbing the full torque about its vertical axis. This condition is met by using two concentric counter-rotating shafts for the torque transmission. Thereby the torque is substantially equalized, whereby the supporting structure is not subjected to said torques. U.S. Pat. No. 4,311,435 deals with a typical device for torque transmission of this kind.

The torque of the shafts is relatively great when rotational speeds are used which correspond to the rotational speed the rotor. Shafts and other transmission elements for the purpose may therefore be both big and expensive.

SUMMARY OF THE INVENTION

The invention has for its object to remedy or reduce at least one of the drawbacks of the prior art.

The object is achieved through the features which are specified in the description below and in the claims that follow.

A wind turbine is provided, in which the rotor of the wind turbine is connected to a rotor shaft, and in which the torque is transmitted from the rotor to a power machine, the wind turbine being characterized by the torque being transmitted, between the rotor and the power machine, via a harmonic gear.

Surprisingly, it has been found that a harmonic gear is well suited for use in a wind turbine.

A harmonic gear, see the detailed explanation of its operation in the particular part of the description, is of such design that a relatively large number of the teeth of the gear components are engaged at the same time. This enables the use of relatively small tooth modules even when transmitting a considerable torque. Most of the components of the gear rotate about a common main centre axis, whereas the rest of the components rotate about a centre axis which is located relatively near the main centre axis.

Thus, a harmonic gear is both compact and light in relation to other relevant gears for the same purpose.

Gear ratios may be adapted to the need in each case. For example, it is quite possible to achieve a gear ratio of one to ten, that is to say one revolution of the rotor causes the output shaft of the harmonic gear to make ten revolutions.

According to one aspect of the wind turbine, the rotor shaft constitutes the input shaft of the harmonic gear. Thereby the rotor shaft and harmonic gear can be formed with dimensions further reduced.

A further aspect of the wind turbine is that the harmonic gear is placed near the rotor. With advantage, the output shaft of the harmonic gear is coupled to an angular gear, in which the torque from the harmonic gear is divided between two concentric shafts.

Any shock pulses and vibrations that occur may be absorbed and dampened, for example by the basically stationary gear rim of the harmonic gear having limited rotatability and being connected to, for example, a cushioning cylinder. Minor rotational deflections are thereby allowed for the gear rim which is rotated back into its initial position when the pulse has been dampened.

The provided transmission of torque in a wind turbine enables a considerable reduction in costs and weight, especially in the case of large wind turbines. This is achieved by the use of a relatively light harmonic gear, and by the torque from the rotor being reduced before it is transmitted to the components that follow, for example to a generator at ground level.

BRIEF DESCRIPTION OF THE DRAWINGS

In what follows is described an example of a preferred embodiment which is visualized in the accompanying drawings, in which.

DESCRIPTION OF AN EMBODIMENT OF THE INVENTION

Figure 1:
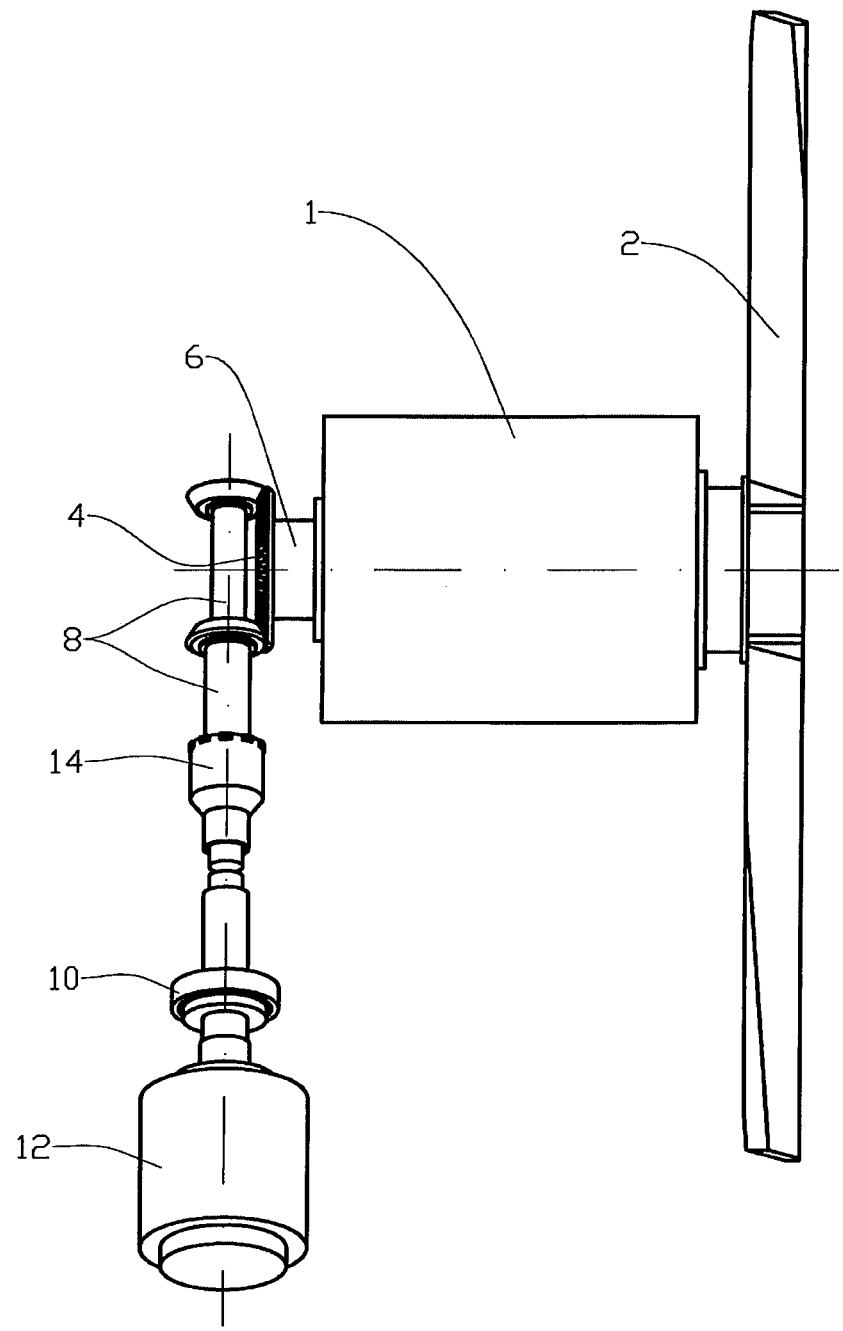
FIG. 1 shows a rotor, transmission elements and a generator belonging to a wind turbine, the generator being positioned at ground level.

In the drawings the reference number 1 indicates a harmonic gear which is connected to a rotor 2. The harmonic gear 1 is connected to an angular gear 4 via an output shaft 6. The torque from the rotor 2 is distributed in the angular gear 4 to two concentric counter-rotating shafts 8 extending from the angular gear 4 down to a planetary gear 10 at an electric generator 12. The generator 12 is located at the ground level.

In the planetary gear 10 the torques from the shafts 8 are gathered before they are transmitted to the generator 12. A damper 14 is connected to the shafts 8 to dampen vibrations in the shafts 8. The shafts 8 may be relatively long.

In the drawings are shown only the rotor 2, harmonic gear 1, transmission elements 4, 8, 10 and 14 and the generator 12. Other necessary components, such as a supporting structure, cables and controls, are not shown.

Figure 2:
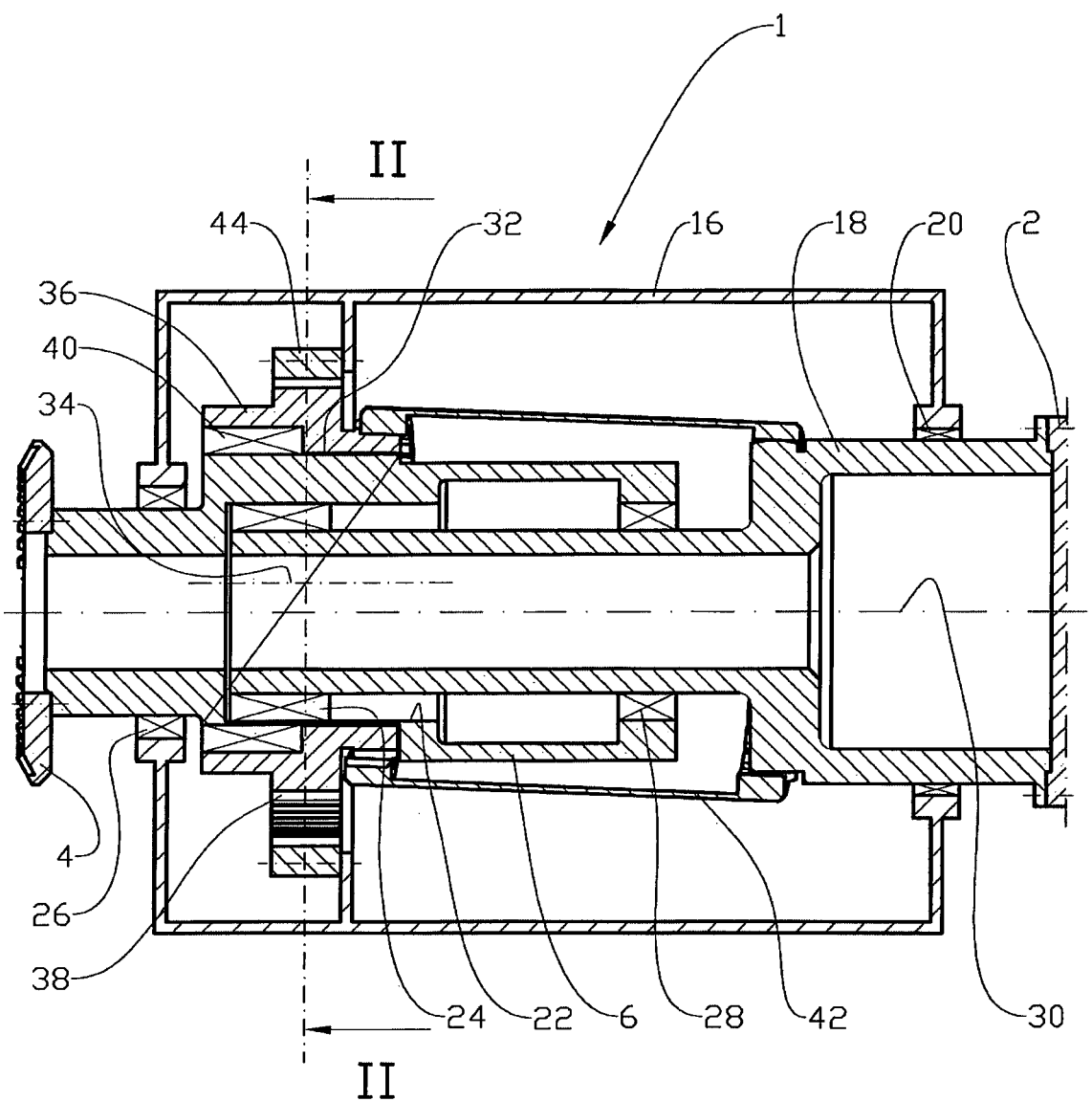
FIG. 2 shows, partially schematically and on a larger scale, a section through the gear of the wind turbine.

The harmonic gear 1 is built into a gear housing 16, see FIG. 2. The rotor 2 is connected to a rotor shaft 18 which forms the input shaft of the harmonic gear 1.

The rotor shaft 18 is supported in the gear housing 16 by means of a first bearing 20 near its end portion facing the rotor 2. At its opposite end portion, the rotor shaft 18 is supported internally in the through bore 22 of the output shaft 6 by means of a second bearing 24.

The output shaft 6 is supported in the gear housing 16 by means of a third bearing 26 near the angular gear 4. At its opposite end portion, extending in over the rotor shaft 18, the output shaft 6 is supported on the rotor shaft 18 by means of a fourth bearing 28. The rotor shaft 18 and the output shaft 6 are thus arranged to rotate at different speeds of rotation about a common centre axis 30.

Figure 3:
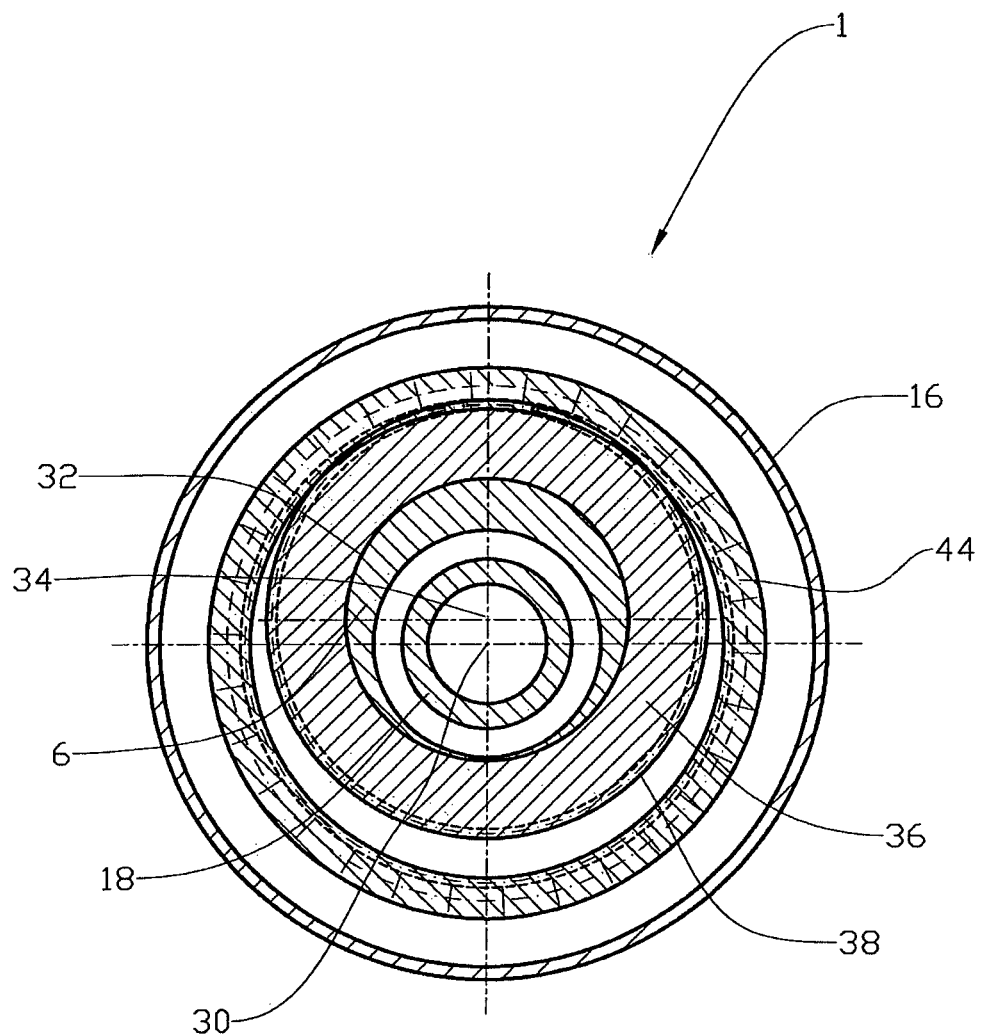
FIG. 3 shows a section II-II of FIG. 2.

At its mid portion, the output shaft 6 is provided with a cylindrical eccentric portion 32, see FIG. 3. The centre axis 34 of the eccentric portion 32 is spaced from the centre axis 30.

A gearwheel 36 which is provided with external teeth 38 is supported freely rotatable on the eccentric portion 32 by means of a fifth bearing 40.

The gearwheel 36 and rotor shaft 18 are rotationally connected by means of a curved tooth coupling 42 of a design known per se.

Figure 4:
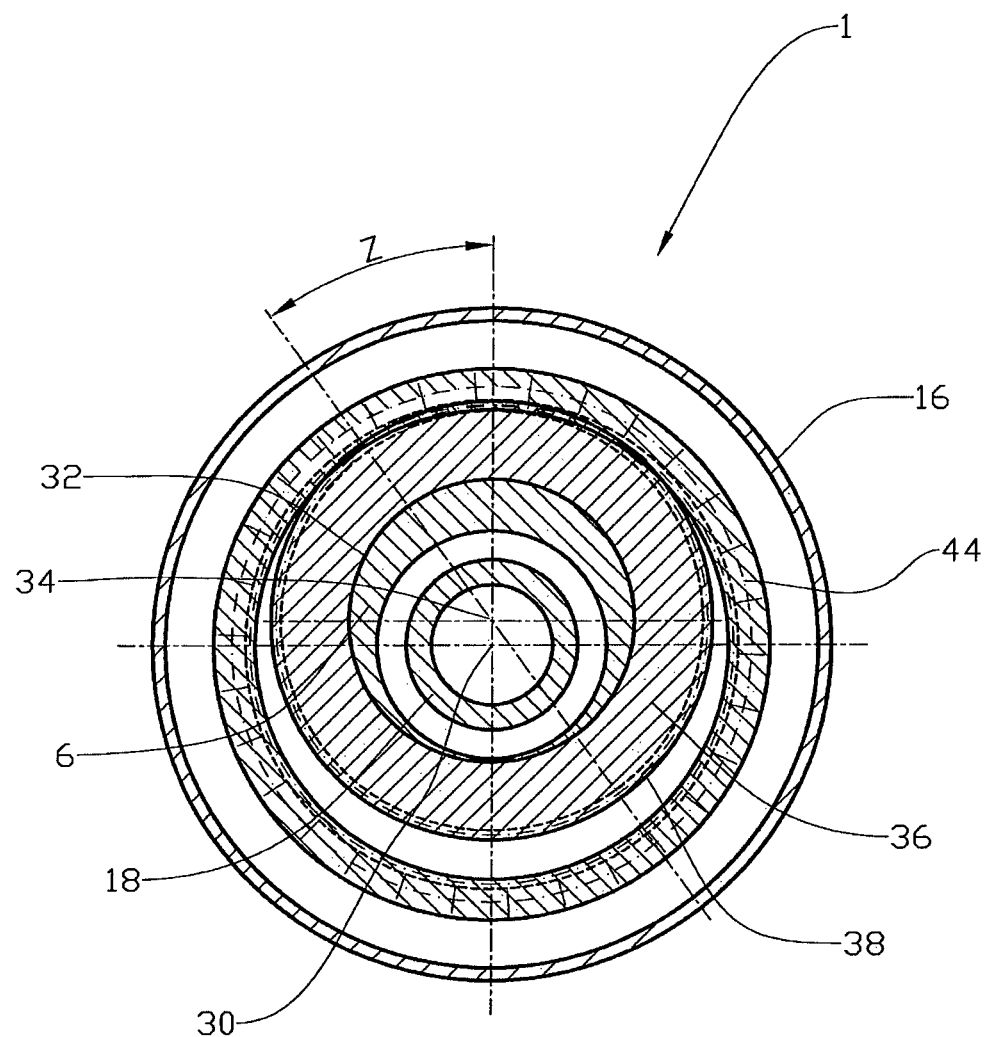
FIG. 4 shows the same as FIG. 3, but after the output shaft of the gear has been rotated one turn.

A gear rim 44 which is shown, in FIG. 4, to be attached to the gear housing 16, is placed concentrically about the centre axis 30. The gear rim 44 matches the external teeth 38 of the gearwheel 36 complementarily. A relatively large number of the external teeth 38 are engaged simultaneously with the gear rim 44, see FIGS. 3 and 4.

In this exemplary embodiment the number of teeth is: the Gearwheel $Zh=90$ and the Gear Rim $Zk=100$.

In FIG. 3 the centre axis 34 of the eccentric portion 32 is located vertically above the centre axis 30. It is assumed that the rotor shaft 18 and gearwheel 36 have then been turned sufficiently for the output shaft 6 to have made one turn.

When the output shaft 6 with the eccentric portion 32 rotates, for example anticlockwise, about the centre axis 30, the gearwheel 36 is brought to rotate clockwise about the centre axis 34 along the gear rim 44. After one turn of the output shaft 6 and thereby the eccentric portion 32, all the teeth of the gearwheel 90 have been engaged with the gear rim 44. Since the gear rim 44 has 100 teeth, the gearwheel 36 has been moved, after a turn of the output shaft 6, ten teeth relative to the gear rim 44 in relation to its initial position, see sector Z in FIG. 4. The initial position is shown in FIG. 3. The sector Z indicates the rotation of the rotor shaft 18 to give a rotation of the output shaft 6.

Thus, the gear ratio is $10/100=1/10$, or more generally for a harmonic gear 1 in which the gear rim 44 does not rotate:

$$\frac{Zk - Zh}{Zk}$$

In this exemplary embodiment one revolution of the rotor shaft 18 causes the output shaft 6 to make ten revolutions in the opposite direction.

What is claimed is:

1. A wind turbine device in which a rotor of the wind turbine is connected to a rotor shaft and where an output shaft having a centre axis, is in geared engagement with the rotor shaft, wherein output shaft outside has an eccentric portion having a centre axis parallel with and spaced from the centre axis of the output shaft, and where a gearwheel is freely rotatable on the eccentric portion, and where external teeth on the gearwheel are in meshed engagement with a gear rim that is placed concentric with the output shaft and where the rotor shaft is in rotational engagement with the gearwheel.

2. The device in accordance with claim 1, wherein the gear rim is stationary.

* * * * *

UNITED STATES PATENT AND TRADEMARK OFFICE
CERTIFICATE OF CORRECTION

PATENT NO.        : 8,450,865 B2
APPLICATION NO.   : 12/812508
DATED             : May 28, 2013
INVENTOR(S)       : Per Olav Haughom It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 483 days.

Signed and Sealed this

Eighth Day of September, 2015

Michelle K. Lee
*Director of the United States Patent and Trademark Office*